(12) United States Patent
Devlin et al.

(10) Patent No.: US 7,879,775 B2
(45) Date of Patent: Feb. 1, 2011

(54) LUBRICANT COMPOSITIONS

(75) Inventors: Mark T. Devlin, Richmond, VA (US); Tze-chi Jao, Glen Allen, VA (US); John T. Loper, Richmond, VA (US); Roger M. Sheets, Glen Allen, VA (US); Gregory H. Guinther, Richmond, VA (US)

(73) Assignee: Afton Chemical Corporation, Richmond, VA (US)

( * ) Notice: Subject to any disclaimer, the term of this patent is extended or adjusted under 35 U.S.C. 154(b) by 367 days.

(21) Appl. No.: 11/457,613

(22) Filed: Jul. 14, 2006

(65) Prior Publication Data

US 2008/0015125 A1 Jan. 17, 2008

(51) Int. Cl.
  C10L 1/22 (2006.01)
  B01D 19/04 (2006.01)
  C10M 133/06 (2006.01)
  C10G 71/00 (2006.01)

(52) U.S. Cl. .................. 508/192; 508/545; 208/18; 208/19

(58) Field of Classification Search .................. 508/192, 508/136, 545; 208/18, 19
See application file for complete search history.

(56) References Cited

U.S. PATENT DOCUMENTS

| | | | |
|---|---|---|---|
| 2,063,629 A | 12/1936 | Salzberg et al. | |
| 2,160,273 A | 5/1939 | Loane et al. | |
| 2,224,695 A | 12/1940 | Prutton | |
| 2,284,409 A | 5/1942 | Erath | |
| 2,284,410 A | 5/1942 | Farmer | |
| 2,447,288 A | 8/1948 | Smith et al. | |
| 2,459,112 A | 1/1949 | Oberright | |
| 2,616,905 A | 11/1952 | Asseff et al. | |
| 2,945,749 A | 7/1960 | Andress, Jr. | |
| 2,962,442 A | 11/1960 | Andress, Jr. | |
| 2,984,550 A | 5/1961 | Chamot | |
| 3,036,003 A | 5/1962 | Dolton | |
| 3,087,936 A | 4/1963 | Le Suer | |
| 3,127,351 A | 3/1964 | Brown et al. | |
| 3,163,603 A | 12/1964 | Le Suer | |
| 3,166,516 A | 1/1965 | Kirkpatrick et al. | |
| 3,172,892 A | 3/1965 | Le Suer et al. | |
| 3,184,474 A | 5/1965 | Catto et al. | |
| 3,202,678 A | 8/1965 | Stuart et al. | |
| 3,215,707 A | 11/1965 | Rense | |
| 3,216,936 A | 11/1965 | Le Suer | |
| 3,219,666 A | 11/1965 | Norman et al. | |
| 3,236,770 A | 2/1966 | Matson et al. | |
| 3,254,025 A | 5/1966 | Le Suer | |
| 3,271,310 A | 9/1966 | Le Suer | |
| 3,272,746 A | 9/1966 | Le Suer et al. | |
| 3,275,554 A | 9/1966 | Wagenaar | |
| 3,281,357 A | 10/1966 | Vogel | |
| 3,281,428 A | 10/1966 | Le Suer | |
| 3,282,955 A | 11/1966 | Le Suer | |
| 3,306,908 A | 2/1967 | Le Suer | |
| 3,311,558 A | 3/1967 | Prizet et al. | |
| 3,316,177 A | 4/1967 | Dorer | |
| 3,329,658 A | 7/1967 | Fields | |
| 3,331,776 A | 7/1967 | Krukziener | |
| 3,338,832 A | 8/1967 | Le Suer | |
| 3,340,281 A | 9/1967 | Brannen | |
| 3,341,542 A | 9/1967 | Le Suer et al. | |
| 3,344,069 A | 9/1967 | Stuebe | |
| 3,346,493 A | 10/1967 | Le Suer | |
| 3,351,552 A | 11/1967 | Le Suer | |
| 3,355,270 A | 11/1967 | Amick et al. | |
| 3,356,702 A | 12/1967 | Farmer et al. | |
| 3,368,972 A | 2/1968 | Otto | |
| 3,381,022 A | 4/1968 | Le Suer | |
| RE26,433 E | 8/1968 | Le Suer | |
| 3,399,141 A | 8/1968 | Clemens | |
| 3,413,347 A | 11/1968 | Worrel | |
| 3,415,750 A | 12/1968 | Anzenberger | |
| 3,433,744 A | 3/1969 | Le Suer | |
| 3,438,757 A | 4/1969 | Honnen et al. | |
| 3,442,808 A | 5/1969 | Traise et al. | |
| 3,444,170 A | 5/1969 | Norman et al. | |
| 3,448,047 A | 6/1969 | Traise et al. | |
| 3,448,048 A | 6/1969 | Le Suer et al. | |
| 3,448,049 A | 6/1969 | Preuss et al. | |

(Continued)

FOREIGN PATENT DOCUMENTS

CA    1 120 461    3/1982

(Continued)

OTHER PUBLICATIONS

M.T. Devlin, et al., "Effect of Detailed Base Oil Structure on Oxidation Performance of Automatic Transmission Fluids," Proceedings of WTC 2005, Sep. 12-16, 2005, pp. 1-2.

(Continued)

*Primary Examiner*—Walter D Griffin
*Assistant Examiner*—Frank C Campanell
(74) *Attorney, Agent, or Firm*—Luedeka, Neely & Graham, P.C.

(57) ABSTRACT

A lubricant composition comprising a phosphorus-containing compound and a base oil comprising less than about 3% by weight of tetracycloparaffins is disclosed. Methods of making and using the lubricant composition are also disclosed.

30 Claims, No Drawings

U.S. PATENT DOCUMENTS

| | | |
|---|---|---|
| 3,449,250 A | 6/1969 | Fields |
| 3,451,933 A | 6/1969 | Leister |
| 3,454,497 A | 7/1969 | Wittner |
| 3,454,555 A | 7/1969 | van der Voort et al. |
| 3,454,607 A | 7/1969 | Le Suer et al. |
| 3,459,661 A | 8/1969 | Schlobohm |
| 3,461,172 A | 8/1969 | Previc |
| 3,467,668 A | 9/1969 | Gruber et al. |
| 3,493,520 A | 2/1970 | Verdol et al. |
| 3,501,405 A | 3/1970 | Willette |
| 3,509,051 A | 4/1970 | Farmer et al. |
| 3,519,565 A | 7/1970 | Coleman |
| 3,522,179 A | 7/1970 | Le Suer |
| 3,533,945 A | 10/1970 | Vogel |
| 3,539,633 A | 11/1970 | Piasek et al. |
| 3,541,012 A | 11/1970 | Stuebe |
| 3,542,680 A | 11/1970 | Le Suer |
| 3,543,678 A | 12/1970 | Hobbs, Jr. |
| 3,558,743 A | 1/1971 | Verdol et al. |
| 3,565,804 A | 2/1971 | Honnen et al. |
| 3,567,637 A | 3/1971 | Sabol |
| 3,574,101 A | 4/1971 | Murphy |
| 3,576,743 A | 4/1971 | Widmer et al. |
| 3,586,629 A | 6/1971 | Otto et al. |
| 3,591,598 A | 7/1971 | Traise et al. |
| 3,600,372 A | 8/1971 | Udelhofen et al. |
| 3,630,904 A | 12/1971 | Musser et al. |
| 3,632,510 A | 1/1972 | Le Suer |
| 3,632,511 A | 1/1972 | Liao |
| 3,634,515 A | 1/1972 | Piasek et al. |
| 3,649,229 A | 3/1972 | Otto |
| 3,658,836 A | 4/1972 | Vineyard |
| 3,666,730 A | 5/1972 | Coleman |
| 3,687,849 A | 8/1972 | Abbott |
| 3,697,428 A | 10/1972 | Meinhardt et al. |
| 3,697,574 A | 10/1972 | Piasek et al. |
| 3,702,300 A | 11/1972 | Coleman |
| 3,703,536 A | 11/1972 | Piasek et al. |
| 3,704,308 A | 11/1972 | Piasek et al. |
| 3,718,663 A | 2/1973 | Piasek et al. |
| 3,725,277 A | 4/1973 | Worrel |
| 3,725,441 A | 4/1973 | Murphy |
| 3,725,480 A | 4/1973 | Traise et al. |
| 3,726,882 A | 4/1973 | Traise et al. |
| 3,736,357 A | 5/1973 | Piasek et al. |
| 3,751,365 A | 8/1973 | Piasek et al. |
| 3,756,953 A | 9/1973 | Piasek et al. |
| 3,793,202 A | 2/1974 | Piasek et al. |
| 3,798,165 A | 3/1974 | Piasek et al. |
| 3,798,247 A | 3/1974 | Piasek et al. |
| 3,803,039 A | 4/1974 | Piasek et al. |
| 3,804,763 A | 4/1974 | Meinhardt |
| 3,836,471 A | 9/1974 | Miller |
| 3,862,981 A | 1/1975 | Demoures et al. |
| 3,872,019 A | 3/1975 | Culbertson et al. |
| 3,904,595 A | 9/1975 | Plonsker et al. |
| 3,936,480 A | 2/1976 | Demoures et al. |
| 3,948,800 A | 4/1976 | Meinhardt |
| 3,950,341 A | 4/1976 | Okamoto et al. |
| 3,957,746 A | 5/1976 | Malec |
| 3,957,854 A | 5/1976 | Miller |
| 3,957,855 A | 5/1976 | Miller |
| 3,980,569 A | 9/1976 | Pindar et al. |
| 3,984,448 A | 10/1976 | Lippsmeier |
| 3,985,802 A | 10/1976 | Piasek et al. |
| 3,991,098 A | 11/1976 | Okamoto |
| 4,006,089 A | 2/1977 | Chibnik |
| 4,011,380 A | 3/1977 | West et al. |
| 4,025,451 A | 5/1977 | Plonsker et al. |
| 4,058,468 A | 11/1977 | Malec |
| 4,071,548 A | 1/1978 | Okamoto |
| 4,083,699 A | 4/1978 | Chibnik |
| 4,090,854 A | 5/1978 | Davis |
| 4,098,705 A | 7/1978 | Sakurai et al. |
| 4,164,473 A | 8/1979 | Coupland et al. |
| 4,173,540 A | 11/1979 | Lonstrup et al. |
| 4,178,258 A | 12/1979 | Papay et al. |
| 4,234,435 A | 11/1980 | Meinhardt et al. |
| 4,259,195 A | 3/1981 | King et al. |
| 4,261,843 A | 4/1981 | King et al. |
| 4,263,152 A | 4/1981 | King et al. |
| 4,265,773 A | 5/1981 | de Vries et al. |
| 4,266,945 A | 5/1981 | Karn |
| 4,272,387 A | 6/1981 | King et al. |
| 4,283,295 A | 8/1981 | deVries et al. |
| 4,285,822 A | 8/1981 | deVries et al. |
| 4,354,950 A | 10/1982 | Hammond et al. |
| 4,362,633 A | 12/1982 | Spence et al. |
| 4,369,119 A | 1/1983 | deVries et al. |
| 4,395,343 A | 7/1983 | de Vries et al. |
| 4,402,840 A | 9/1983 | deVries et al. |
| 4,431,552 A | 2/1984 | Salentine |
| 4,455,243 A | 6/1984 | Liston |
| 4,466,901 A | 8/1984 | Hunt et al. |
| 4,485,023 A | 11/1984 | Serres et al. |
| 4,652,387 A | 3/1987 | Andress, Jr. et al. |
| 4,692,256 A | 9/1987 | Umemura et al. |
| 4,765,918 A | 8/1988 | Love et al. |
| 4,863,623 A | 9/1989 | Nalesnik |
| 4,889,647 A | 12/1989 | Rowan et al. |
| 4,952,367 A | 8/1990 | Porter et al. |
| 4,966,719 A | 10/1990 | Coyle et al. |
| 4,978,464 A | 12/1990 | Coyle et al. |
| 4,990,271 A | 2/1991 | Franis |
| 4,995,996 A | 2/1991 | Coyle et al. |
| 5,075,383 A | 12/1991 | Migdal et al. |
| 5,137,647 A | 8/1992 | Karol |
| 5,137,980 A | 8/1992 | DeGonia et al. |
| 5,139,688 A | 8/1992 | Nalesnik |
| 5,230,834 A * | 7/1993 | Gutierrez et al. ............ 508/236 |
| 5,266,223 A | 11/1993 | Song et al. |
| 5,282,991 A | 2/1994 | Waddoups et al. |
| 5,350,532 A | 9/1994 | Song et al. |
| 5,354,484 A | 10/1994 | Schwind et al. |
| 5,356,999 A | 10/1994 | Kapuscinski et al. |
| 5,372,735 A | 12/1994 | Ohtani et al. |
| 5,374,364 A | 12/1994 | Kapuscinski et al. |
| 5,412,130 A | 5/1995 | Karol |
| 5,424,366 A | 6/1995 | Kapuscinski et al. |
| 5,435,926 A | 7/1995 | Gutierrez et al. |
| 5,441,656 A | 8/1995 | Ohtani et al. |
| 5,634,951 A | 6/1997 | Colucci et al. |
| 5,725,612 A | 3/1998 | Malfer et al. |
| 5,763,372 A | 6/1998 | Tersigni et al. |
| 5,789,353 A | 8/1998 | Scattergood |
| 5,891,786 A | 4/1999 | Srinivasan et al. |
| 6,103,674 A | 8/2000 | Nalesnik et al. |
| 6,107,257 A | 8/2000 | Valcho et al. |
| 6,107,258 A | 8/2000 | Esche, Jr. et al. |
| 6,117,825 A | 9/2000 | Liu et al. |
| 6,117,826 A | 9/2000 | Baranski et al. |
| 6,232,276 B1 | 5/2001 | Stiefel et al. |
| 6,451,745 B1 * | 9/2002 | Ward ..................... 508/192 |
| 6,500,786 B1 | 12/2002 | Hartley et al. |
| 2002/0072478 A1 * | 6/2002 | Ishida et al. ............ 508/192 |
| 2005/0043191 A1 | 2/2005 | Farng et al. |
| 2005/0101494 A1 | 5/2005 | Iyer et al. |
| 2005/0133407 A1 | 6/2005 | Abernathy et al. |
| 2005/0137096 A1 | 6/2005 | Yoon et al. |
| 2005/0261145 A1 * | 11/2005 | Rosenbaum et al. ........ 508/466 |
| 2006/0094607 A1 | 5/2006 | Devlin et al. |
| 2006/0264340 A1 | 11/2006 | Iyer et al. |
| 2006/0293193 A1 | 12/2006 | Rosenbaum et al. |
| 2008/0051304 A1 | 2/2008 | Devlin et al. |

| | | | |
|---|---|---|---|
| 2008/0051305 | A1 | 2/2008 | Devlin et al. |

FOREIGN PATENT DOCUMENTS

| | | | |
|---|---|---|---|
| CA | 2487767 A1 | 5/2005 | |
| CN | 1218096 A | 6/1999 | |
| DE | 68923716 T2 | 3/1996 | |
| EP | 0330523 | 8/1989 | |
| EP | 1136496 A1 | 9/2001 | |
| EP | 1136497 A1 | 9/2001 | |
| EP | 1516910 | 3/2005 | |
| EP | 1518919 A1 | 3/2005 | |
| EP | 1518921 A1 | 3/2005 | |
| EP | 1 657 293 | 5/2006 | |
| EP | 1 657 293 A2 | 5/2006 | |
| EP | 1 661 971 A1 | 5/2006 | |
| EP | 1 688 476 | 8/2006 | |
| EP | 1724330 A1 | 11/2006 | |
| EP | 1785476 A1 | 5/2007 | |
| EP | 1 900 797 | 3/2008 | |
| FR | 2904327 | 2/2008 | |
| GB | 530491 A | 12/1940 | |
| GB | 909243 A | 10/1962 | |
| GB | 911491 A | 11/1962 | |
| GB | 2 409 462 | 6/2005 | |
| GB | 2 416 775 | 2/2006 | |
| RU | 2009176 C1 | 3/1994 | |
| RU | 2129141 C1 | 4/1999 | |
| RU | 2276683 C1 | 5/2006 | |
| WO | WO 87/07638 | 12/1987 | |
| WO | 97/44413 A1 | 11/1997 | |
| WO | 0008119 | 2/2000 | |
| WO | WO 02/064710 | 8/2002 | |
| WO | 03/064568 A3 | 8/2003 | |
| WO | 2005066314 A1 | 7/2005 | |
| WO | 2005/087901 A2 | 9/2005 | |
| WO | WO 2005/113734 | 12/2005 | |
| WO | WO 2006/099057 | 9/2006 | |
| WO | WO 2007/075831 | 7/2007 | |

OTHER PUBLICATIONS

Analytical Chemistry, 64:2227 (1992).

M. T. Devlin, T. Hammock, and T-C. Jao, "Effect of Mechanical Shear on the Thin Film Properties of Base Oil-Polymer Mixtures", Lubrication Science vol. 14 (2), 2002.

D. Dawson, et al., "Lubrication at the Frontier: The Role of The Interface and Surface Layers in the Thin Film and Boundary Regime," Elsevier Science B.V., 1999, p. 769-766.

R.C. Castle, et al., "The Behavior of Friction Modifiers Under Boundary and Mixed EHD Conditions," SAE 961142, pp. 1-4.

Liza Taylor, et al. "Film-Forming Properties of Zinc-Based and Ashless Antiwear Additives," International Spring Fuels & Lubricants, Paris, France, Jun. 19-22, 2000, pp. 1-11.

M.T. Devlin, et al. "Improved Understanding of Axle Oil Rheology Effects on Torque Transfer Efficiency and Axle Oil Operating Temperature," SAE 2003-01-1972, 2003, pp. 1-10.

Klamann, Dieter: Schmierstoffe und verwandte Produkte. Weinheim, Verlag Chemie, 1982, S. 81-101. ISBN 3-527-25966-X.

German Office Action dated Sep. 4, 2008, from corresponding German patent application.

French Search Report, French Patent Office, French Patent Application No. 0756498, Dec. 7, 2009.

\* cited by examiner

LUBRICANT COMPOSITIONS

FIELD OF THE DISCLOSURE

The present disclosure relates to lubricating compositions comprising a phosphorus-containing compound and a base oil comprising less than about 3% by weight of tetracycloparaffins.

BACKGROUND OF THE DISCLOSURE

In recent years there has been growing concern to produce energy-efficient lubricated components. Moreover, modern engine oil specifications require lubricants to demonstrate fuel efficiency in standardized engine tests. The thickness and frictional characteristics of thin lubricant films are known to affect the fuel economy properties of oils.

Thin-film friction is the friction generated from fluid, such as a lubricant, pushing between two surfaces, wherein the distance between the two surfaces is very narrow. It is known that different additives normally present in a lubricant composition form films of different thicknesses, which can have an effect on thin-film friction. Moreover, some additives have a narrow range of conditions wherein they provide reduced friction properties to a lubricant composition. Further, some additives, such as zinc dialkyl dithiophosphate (ZDDP) are known to increase thin-film friction.

However, it is also known that some additives are very expensive. And, the use of additional amounts of an additive to a lubricant composition to reduce thin-film friction can be quite costly to the manufacturer.

A major component of a lubricant composition can be the base oil, which is relatively inexpensive. Base oils are known and have been categorized under Groups I-V. The base oils are placed in a given Group based upon their % saturates, % sulfur content, and viscosity index. For example, all Group II base oils have greater than 90% saturates, less than 0.03% sulfur, and a viscosity index ranging from $\geq 80$ to $\leq 120$. However, the proportions of aromatics, paraffinics, and naphthenics can vary substantially in the Group II base oils. It is known that the difference in these proportions can affect the properties of a lubricant composition, such as oxidative stability.

What is needed is a lubricant composition that is inexpensive and can provide at least one of reduced thin-film friction and increased fuel economy.

SUMMARY OF THE DISCLOSURE

In accordance with the disclosure, there is disclosed a lubricant composition comprising a phosphorus-containing compound and a base oil comprising less than about 3% by weight of tetracycloparaffins.

Moreover, there is disclosed a lubricant composition comprising a base oil comprising less than about 3% by weight of tetracycloparaffins; a metal-free-containing, phosphorus-containing compound; a dispersant; and a friction modifier.

There is also disclosed a lubricant composition comprising a base oil comprising less than about 3% by weight of tetracycloparaffins; a metal-free-containing, phosphorus-containing compound; an ethylene-propylene copolymer; and a friction modifier.

In another aspect, there is disclosed a method of reducing thin-film friction of a fluid between surfaces comprising providing to the fluid a composition comprising a phosphorus-containing compound and a base oil comprising less than about 3% by weight of tetracycloparaffins.

In an aspect, there is disclosed a method of increasing fuel efficiency in a vehicle comprising providing to a vehicle a composition comprising a phosphorus-containing compound and a base oil comprising less than about 3% by weight of tetracycloparaffins.

Further, there is disclosed a method of making a lubricant composition comprising combining a phosphorus-containing compound and a base oil comprising less than about 3% by weight of tetracycloparaffins.

Additional objects and advantages of the disclosure will be set forth in part in the description which follows, and can be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

DESCRIPTION OF THE EMBODIMENTS

The present disclosure relates to lubricating compositions comprising a phosphorus-containing compound and a base oil comprising less than about 3% by weight of tetracycloparaffins. In an aspect, the lubricating composition can further comprise a friction modifying compound. In a further aspect, the lubricating composition can further comprise a dispersant.

The base oil can be any base oil categorized in Groups I-V. In an aspect, the base oil is a Group II base oil. The base oil can comprise less than about 3% by weight, for example less than about 2% by weight, and as a further example less than about 1% by weight of tetracycloparaffins relative to the total weight of the base oil.

The disclosed base oils can have a lower thin-film friction coefficient as compared to base oils not comprising less than 3% by weight of tetracycloparaffins. Moreover, it is believed, without being limited to any particular theory, that when the concentration of base oil structures is reduced the effect of individual additives on thin-film friction is altered. In an aspect, the combination of certain additives with the disclosed base oil can have a synergistic effect.

The base oil can be present in the lubricating composition in any desired or effective amount. For example, the base oil can be present in a major amount. A "major amount" is understood to mean greater than or equal to 50% by weight relative to the total weight of the composition. As a further example, the base oil can be present in an amount greater than or equal to 80%, and as an additional example, greater than or equal to 90% by weight relative to the total weight of the composition.

The disclosed lubricating composition can comprise a phosphorus-containing compound. In an aspect, the phosphorus-containing compound can be a metal-free-containing, phosphorus-containing compound.

Moreover, the phosphorus-containing compound can include oil-soluble amine salts of a phosphoric acid ester, such as those taught in U.S. Pat. Nos. 5,354,484 and 5,763,372, the disclosures of which are hereby incorporated by reference; and reaction products of dicyclopentadiene and a thiophosphoric acid.

The amine salts of a phosphoric acid ester can be prepared by reacting a phosphoric acid ester with ammonia or a basic nitrogen compound, such as an amine. The salts can be formed separately, and then the salt of the phosphoric acid ester can be added to the lubricating composition.

The phosphoric acid esters useful in preparing the amine salts of the present invention can be characterized by the formula

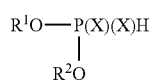 (I)

wherein $R^1$ can be hydrogen or a hydrocarbyl group, $R^2$ can be a hydrocarbyl group, and both X groups can be either O or S.

An exemplary method of preparing compositions containing (I) comprises reacting at least one hydroxy compound of the formula ROH with a phosphorus compound of the formula $P_2X_5$ wherein R can be a hydrocarbyl group and X can be O or S. The phosphorus-containing compounds obtained in this manner can be mixtures of phosphorus compounds, and are generally mixtures of mono- and dihydrocarbyl-substituted phosphoric and/or dithiophosphoric acids depending on a choice of phosphorus reactant (i.e., $P_2O_5$ or $P_2S_5$).

The hydroxy compound used in the preparation of the phosphoric acid esters of this disclosure can be characterized by the formula ROH wherein R can be hydrocarbyl group. The hydroxy compound reacted with the phosphorus compound can comprise a mixture of hydroxy compounds of the formula ROH wherein the hydrocarbyl group R can contain from about 1 to about 30 carbon atoms. It is necessary, however, that the amine salt of the substituted phosphoric acid ester ultimately prepared is soluble in the lubricating compositions of the present disclosure. Generally, the R group will contain at least about 2 carbon atoms, typically about 3 to about 30 carbon atoms.

The R group can be aliphatic or aromatic such as alkyl, aryl, alkaryl, aralkyl and alicyclic hydrocarbon groups. Non-limiting examples of useful hydroxy compounds of the formula ROH include, for example, ethyl alcohol, iso-propyl, n-butyl alcohol, amyl alcohol, hexyl alcohol, 2-ethyl-hexyl alcohol, nonyl alcohol, dodecyl alcohol, stearyl alcohol, amyl phenol, octyl phenol, nonyl phenol, methyl cyclohexanol, and alkylated naphthol, etc.

In an aspect the alcohols, ROH, can be aliphatic alcohols and for example, primary aliphatic alcohols containing at least about 4 carbon atoms. Accordingly, examples of the exemplary monohydric alcohols ROH which can be useful in the present disclosure include, amyl alcohol, 1-octanol, 1-decanol, 1-dodecanol, 1-tetradecanol, 1-hexadecanol, 1-octadecanol, oleyl alcohol, linoleyl alcohol, linolenyl alcohol, phytol, myricyl alcohol, lauryl alcohol, myristyl alcohol, cetyl alcohol, stearyl alcohol and behenyl alcohol. Commercial alcohols (including mixtures) are contemplated herein, and these commercial alcohols can comprise minor amounts of alcohols which, although not specified herein, do not detract from the major purposes of this disclosure.

The molar ratio of the hydroxy compound ROH to phosphorus reactant $P_2X_5$ in the reaction should be within the range of from about 1:1 to about 4:1, an exemplary ratio being 3:1. The reaction can be effected simply by mixing the two reactants at an elevated temperature such as temperatures above about 50° C. up to the composition temperature of any of the reactants or the desired product. In an aspect, the temperature can range from about 50° C. to about 150° C., and can be most often below about 100° C. The reaction can be carried out in the presence of a solvent which facilitates temperature control and mixing of the reactants. The solvent can be any inert fluid substance in which either one or both reactants are soluble, or the product is soluble. Such solvents include benzene, toluene, xylene, n-hexane, cyclohexane, naphtha, diethyl ether carbitol, dibutyl ether dioxane, chlorobenzene, nitrobenzene, carbon tetrachloride or chloroform.

The product of the above reaction is acidic, but its chemical constitution is not precisely known. Evidence indicates, however, that the product is a mixture of acidic phosphates comprising predominantly of the mono- and di-esters of phosphoric acid (or thio- or dithiophosphoric acid), the ester group being derived from the alcohol ROH.

The amine salts of the present disclosure can be prepared by reaction of the above-described phosphoric acid esters such as represented by Formula I with at least one amino compound which can be a primary or secondary. In an aspect, the amines which are reacted with the substituted phosphoric acids to form the amine salts are primary hydrocarbyl amines having the general formula

wherein R' can be a hydrocarbyl group containing up to about 150 carbon atoms and will more often be an aliphatic hydrocarbyl group containing from about 4 to about 30 carbon atoms.

In an aspect, the hydrocarbyl amines which are useful in preparing the amine salts of the present disclosure can be primary hydrocarbyl amines containing from about 4 to about 30 carbon atoms in the hydrocarbyl group, and for example from about 8 to about 20 carbon atoms in the hydrocarbyl group. The hydrocarbyl group can be saturated or unsaturated. Representative examples of primary saturated amines are those known as aliphatic primary fatty amines. Typical fatty amines include alkyl amines such as n-hexylamine, n-octylamine, n-decylamine, n-dodecylamine, n-tetradecylamine, n-pentadecylamine, n-hexadecylamine, n-octadecylamine (stearyl amine), etc. These primary amines are available in both distilled and technical grades. While the distilled grade will provide a purer reaction product, the desirable amides and imides will form in reactions with the amines of technical grade. Also suitable are mixed fatty amines.

In another aspect, the amine salts of the phosphorus-containing compound can be those derived from tertiary-aliphatic primary amines having at least about 4 carbon atoms in the alkyl group. For the most part, they can be derived from alkyl amines having a total of less than about 30 carbon atoms in the alkyl group. Usually the tertiary aliphatic primary amines are monoamines represented by the formula

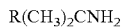

wherein R can be a hydrocarbyl group containing from one to about 30 carbon atoms. Such amines can be illustrated by tertiary-butyl amine, tertiary-hexyl primary amine, 1-methyl-1-amino-cyclohexane, tertiary-octyl primary amine, tertiary-decyl primary amine, tertiary-dodecyl primary amine, tertiary-tetradecyl primary amine, tertiary-hexadecyl primary amine, tertiary-octadecyl primary amine, tertiary-tetracosanyl primary amine, tertiary-octacosanyl primary amine.

Mixtures of amines are also useful for the purposes of this disclosure. Illustrative of amine mixtures of this type is a mixture of $C_{11}$-$C_{14}$ tertiary alkyl primary amines and a similar mixture of $C_{18}$-$C_{22}$ tertiary alkyl primary amines. The tertiary alkyl primary amines and methods for their preparation are well known to those of ordinary skill in the art and, therefore, further discussion is unnecessary. The tertiary alkyl primary amine useful for the purposes of this disclosure and methods for their preparation are described in U.S. Pat. No. 2,945,749, which is hereby incorporated by reference for its teaching in this regard.

Primary amines in which the hydrocarbon chain comprises olefinic unsaturation also are quite useful. Thus, the R' and R" groups may contain one or more olefinic unsaturation depending on the length of the chain, usually no more than one double bond per 10 carbon atoms. Representative amines are dodecenylamine, myristoleylamine, palmitoleylamine, oleylamine and linoleylamine.

Secondary amines include dialkylamines having two of the above alkyl groups including such commercial fatty secondary amines, and also mixed dialkylamines where R' is a fatty amine and R" may be a lower alkyl group (1-9 carbon atoms) such as methyl, ethyl, n-propyl, i-propyl, butyl, etc., or R" may be an alkyl group bearing other non-reactive or polar substitutents (CN, alkyl, carbalkoxy, amide, ether, thioether, halo, sulfoxide, sulfone) such that the essentially hydrocarbon character of the radical is not destroyed. The fatty polyamine diamines include mono-or dialkyl, symmetrical or asymmetrical ethylene diamines, propane diamines (1,2, or 1,3), and polyamine analogs of the above. Suitable polyamines include N-coco-1,3-diaminopropane,N-soyaalkyl trimethylenediamine, N-tallow-1,3-diaminopropane, or N-oleyl-1,3-diaminopropane.

The oil-soluble amine salts can be prepared by mixing the above-described phosphoric acid esters with the above-described amines at room temperature or above. Generally, mixing at room temperature for a period of from up to about one hour is sufficient. The amount of amine reacted with the phosphoric acid ester to form the salts of the disclosure is at least about one equivalent weight of the amine (based on nitrogen) per equivalent of phosphoric acid, and the ratio of equivalents generally is about one.

Methods for the preparation of such amine salts are well known and reported in the literature. See for example, U.S. Pat. Nos. 2,063,629; 2,224,695; 21447,288; 2,616,905; 3,984,448; 4,431,552; 5,354,484; Pesin et al, Zhurnal Obshchei Khimii, Vol, 31, No. 8, pp. 2508-2515 (1961); and PCT International Application Publication No. WO 87/07638, the disclosures of all of which are hereby incorporated by reference.

Alternatively, the salts can be formed in situ when the acidic phosphoric acid ester is blended with the above-described amines when forming a gear oil concentrate or the formulated gear oil itself.

Another phosphorus-containing compound for use in the lubricating composition herein comprises the reaction products of dicyclopentadiene and thiophosphoric acids, also referred to herein as dicyclopentadiene dithioates. Thiophosphoric acids have the formula:

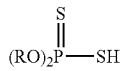

wherein R can be a hydrocarbyl group having from about 2 to about 30, for example from about 3 to about 18 carbon atoms. In an aspect, R comprises a mixture of hydrocarbyl groups containing from about 3 to about 18 carbon atoms.

In an aspect, the phosphorus-containing compound is at least one of neopentyl glycol phosphite, a sulfur-containing, neopentyl glycol phospite, and a salt of a sulfur-containing, neopentyl glycol phosphite.

The dicyclopentadiene dithioates can be prepared by mixing dicyclopentadiene and a dithiophosphoric acid for a time and temperature sufficient to react the thioacid with the dicylcopentadiene. Typical reaction times can range from 30 minutes to 6 hours, although suitable reaction conditions can readily be determined by one skilled in the art. The reaction product can be subjected to conventional post-reaction work up including vacuum stripping and filtering.

The disclosed lubricating composition can further comprise a friction modifying compound. The friction modifier for use in the disclosed lubricating composition can be selected from among many suitable compounds and materials useful for imparting this function in lubricant compositions. The friction modifier can be used as a single type of compound or a mixture of different types of compounds. Non-limiting examples of the friction modifier include a nitrogen-containing compound, an ash-containing compound, and a non-nitrogen-containing compound. In an aspect, the disclosed lubricating compositions can comprise a non-nitrogen-containing compound and a molybdenum-containing compound.

The nitrogen-containing compound can be any compound that comprises a basic nitrogen. In an aspect, the nitrogen-containing compound can be a long chain alkylene amine. Long chain alkylene amine friction modifying compounds include, for example, N-aliphatic hydrocarbyl-substituted trimethylenediamines in which the N-aliphatic hydrocarbyl-substitutent is at least one straight chain aliphatic hydrocarbyl group free of acetylenic unsaturation and having in the range of about 14 to about 20 carbon atoms. A non-limiting example of such friction modifier compounds is N-oleyl-trimethylene diamine. Other suitable compounds include N-tallow-trimethylene diamine and N-coco-trimethylene diamine.

One group of friction modifiers includes the N-aliphatic hydrocarbyl-substituted diethanol amines in which the N-aliphatic hydrocarbyl-substitutent is at least one straight chain aliphatic hydrocarbyl group free of acetylenic unsaturation and having in the range of about 14 to about 20 carbon atoms.

As used herein, the term "hydrocarbyl substitutent" or "hydrocarbyl group" is used in its ordinary sense, which is well-known to those skilled in the art Specifically, it refers to a group having a carbon atom directly attached to the remainder of the molecule and having predominantly hydrocarbon character. Examples of hydrocarbyl groups include:

(1) hydrocarbon substitutents, that is, aliphatic (e.g., alkyl or alkenyl), alicyclic (e.g., cycloalkyl, cycloalkenyl) substitutents, and aromatic-, aliphatic-, and alicyclic-substituted aromatic substitutents, as well as cyclic substitutents wherein the ring is completed through another portion of the molecule (e.g., two substitutents together form an alicyclic radical);

(2) substituted hydrocarbon substitutents, that is, substitutents containing non-hydrocarbon groups which, in the context of this invention, do not alter the predominantly hydrocarbon substitutent (e.g., halo (especially chloro and fluoro), hydroxy, alkoxy, mercapto, alkylmercapto, nitro, nitroso, and sulfoxy);

(3) hetero substitutents, that is, substitutents which, while having a predominantly hydrocarbon character, in the context of this invention, contain other than carbon in a ring or chain otherwise composed of carbon atoms. Heteroatoms include sulfur, oxygen, nitrogen, and encompass substitutents as pyridyl, furyl, thienyl and imidazolyl. In general, no more than two, for example no more than one, non-hydrocarbon substitutent will be present for every ten carbon atoms in the hydrocarbyl group; typically, there will be no non-hydrocarbon substitutents in the hydrocarbyl group.

As discussed above, the friction modifier can comprise a mixture of different compounds, such as a combination of at least one N-aliphatic hydrocarbyl-substituted diethanol amine and at least one N-aliphatic hydrocarbyl-substituted trimethylene diamine in which the N-aliphatic hydrocarbyl-substitutent is at least one straight chain aliphatic hydrocarbyl group free of acetylenic unsaturation and having in the range of about 14 to about 20 carbon atoms. Further details concerning this friction modifier combination are set forth in U.S. Pat. Nos. 5,372,735 and 5,441,656, the disclosures of which are hereby incorporated by reference.

The friction modifier can be an ash-containing compound. In an aspect, the ash-containing compound can be a molybdenum-containing compound. The molybdenum-containing compound for use in the lubricating compositions disclosed herein can be sulfur- and/or phosphorus-free. A sulfur- and phosphorus-free molybdenum-containing compound can be prepared by reacting a sulfur and phosphorus-free molybdenum source with an organic compound containing amino and/or alcohol groups. Examples of sulfur- and phosphorus-free molybdenum sources include molybdenum trioxide, ammonium molybdate, sodium molybdate and potassium molybdate. The amino groups can be monoamines, diamines, or polyamines. The alcohol groups can be mono-substituted alcohols, diols or bis-alcohols, or polyalcohols. As an example, the reaction of diamines with fatty oils produces a product containing both amino and alcohol groups that can react with the sulfur- and phosphorus-free molybdenum source.

Examples of sulfur- and phosphorus-free molybdenum-containing compounds appearing in patents and patent applications which are fully incorporated herein by reference include the following: Compounds prepared by reacting certain basic nitrogen compounds with a molybdenum source as defined in U.S. Pat. Nos. 4,259,195 and 4,261,843. Compounds prepared by reacting a hydrocarbyl substituted hydroxy alkylated amine with a molybdenum source as defined in U.S. Pat. No. 4,164,473. Compounds prepared by reacting a phenol aldehyde condensation product, a mono-alkylated alkylene diamine, and a molybdenum source as defined in U.S. Pat. No. 4,266,945. Compounds prepared by reacting a fatty oil, diethanolamine, and a molybdenum source as defined in U.S. Pat. No. 4,889,647. Compounds prepared by reacting a fatty oil or acid with 2-(2-aminoethyl) aminoethanol, and a molybdenum source as defined in U.S. Pat. No. 5,137,647. Compounds prepared by reacting a secondary amine with a molybdenum source as defined in U.S. Pat. No. 4,692,256. Compounds prepared by reacting a diol, diamino, or amino-alcohol compound with a molybdenum source as defined in U.S. Pat. No. 5,412,130. Compounds prepared by reacting a fatty oil, mono-alkylated alkylene diamine, and a molybdenum source as defined in European Patent Application EP 1 136 496 A1. Compounds prepared by reacting a fatty acid, mono-alkylated alkylene diamine, glycerides, and a molybdenum source as defined in European Patent Application EP 1 136 497 A1. Compounds prepared by reacting a fatty oil, diethanolamine, and a molybdenum source as defined in U.S. Pat. No. 4,889,647.

In an aspect, a sulfur-containing, molybdenum-containing compound can also be used in the lubricating compositions disclosed herein. The sulfur-containing, molybdenum-containing compound can be prepared by a variety of methods. One method involves reacting a sulfur- and/or phosphorus-free molybdenum source with an amino group and one or more sulfur sources. Sulfur sources can include for example, but are not limited to, carbon disulfide, hydrogen sulfide, sodium sulfide and elemental sulfur. Alternatively, the sulfur-containing, molybdenum-containing compound can be prepared by reacting a sulfur-containing molybdenum source with an amino group or thiuram group and optionally a second sulfur source. As an example, the reaction of molybdenum trioxide with a secondary amine and carbon disulfide produces molybdenum dithiocarbamates. Alternatively, the reaction of $(NH_4)_2Mo_3S_{13}*n(H_2O)$ where n ranges from about 0 to 2, with a tetralkylthiuram disulfide, produces a trinuclear sulfur-containing molybdenum dithiocarbamate.

Non-limiting examples of sulfur-containing, molybdenum-containing compounds appearing in patents and patent applications include the following: Compounds prepared by reacting molybdenum trioxide with a secondary amine and carbon disulfide as defined in U.S. Pat. Nos. 3,509,051 and 3,356,702. Compounds prepared by reacting a sulfur-free molybdenum source with a secondary amine, carbon disulfide, and an additional sulfur source as defined in U.S. Pat. No. 4,098,705. Compounds prepared by reacting a molybdenum halide with a secondary amine and carbon disulfide as defined in U.S. Pat. No. 4,178,258. Compounds prepared by reacting a molybdenum source with a basic nitrogen compound and a sulfur source as defined in U.S. Pat. Nos. 4,263,152, 4,265,773, 4,272,387, 4,285,822, 4,369,119, 4,395,343. Compounds prepared by reacting ammonium tetrathiomolybdate with a basic nitrogen compound as defined in U.S. Pat. No. 4,283,295. Compounds prepared by reacting an olefin, sulfur, an amine and a molybdenum source as defined in U.S. Pat. No. 4,362,633. Compounds prepared by reacting ammonium tetrathiomolybdate with a basic nitrogen compound and an organic sulfur source as defined in U.S. Pat. No. 4,402,840. Compounds prepared by reacting a phenolic compound, an amine and a molybdenum source with a sulfur source as defined in U.S. Pat. No. 4,466,901. Compounds prepared by reacting a triglyceride, a basic nitrogen compound, a molybdenum source, and a sulfur source as defined in U.S. Pat. No. 4,765,918. Compounds prepared by reacting alkali metal alkylthioxanthate salts with molybdenum halides as defined in U.S. Pat. No. 4,966,719. Compounds prepared by reacting a tetralkylthiuram disulfide with molybdenum hexacarbonyl as defined in U.S. Pat. No. 4,978,464. Compounds prepared by reacting an alkyl dixanthogen with molybdenum hexacarbonyl as defined in U.S. Pat. No. 4,990,271. Compounds prepared by reacting alkali metal alkylxanthate salts with dimolybdenum tetra-acetate as defined in U.S. Pat. No. 4,995,996. Compounds prepared by reacting $(NH_4)_2Mo_3S_{13}*_2H_2O$ with an alkali metal dialkyldithiocarbamate or tetralkyl thiuram disulfide as define in U.S. Pat. No. 6,232,276. Compounds prepared by reacting an ester or acid with a diamine, a molybdenum source and carbon disulfide as defined in U.S. Pat. No. 6,103,674. Compounds prepared by reacting an alkali metal dialkyldithiocarbamate with 3-chloropropionic acid, followed by molybdenum trioxide, as defined in U.S. Pat. No. 6,117,826.

Non-limiting examples of molybdenum-containing compounds include molybdenum carboxylates, molybdenum amides, molybdenum thiophosphates, molybdenum thiocarbamates, molybdenum dithiocarbamates, and so forth.

Additional examples of ash-containing compounds include, but are not limited to, titanium-containing compounds and tungsten-containing compounds.

Another suitable group of friction modifiers include non-nitrogen-containing compounds, such as polyolesters, for example, glycerol monooleate (GMO), glycerol monolaurate (GML), and the like.

The friction modifying compound can be present in the lubricating composition in any desired or effective amount. In an aspect, the lubricating composition can comprise from about 0.05% to about 3% by weight, for example from about 0.2% to about 1.5%, and as a further example from about 0.3% to about 1% by weight relative to the total weight of the lubricating composition. However, one of ordinary skill in the art would understand that any amount can be used.

The dispersant for use in the disclosed lubricating composition can be selected from any of the ashless dispersants known to those skilled in the art. Suitable ashless dispersants may include ashless dispersants such as succinimide dispersants, Mannich base dispersants, and polymeric polyamine dispersants. Hydrocarbyl-substituted succinic acylating agents can be used to make hydrocarbyl-substituted succinimides. The hydrocarbyl-substituted succinic acylating agents include, but are not limited to, hydrocarbyl-substituted succinic acids, hydrocarbyl-substituted succinic anhydrides, the hydrocarbyl-substituted succinic acid halides (for example, the acid fluorides and acid chlorides), and the esters of the hydrocarbyl-substituted succinic acids and lower alcohols (e.g., those containing up to 7 carbon atoms), that is, hydrocarbyl-substituted compounds which can function as carboxylic acylating agents.

Hydrocarbyl substituted acylating agents can be made by reacting a polyolefin or chlorinated polyolefin of appropriate molecular weight with maleic anhydride. Similar carboxylic reactants can be used to make the acylating agents. Such reactants can include, but are not limited to, maleic acid, fumaric acid, malic acid, tartaric acid, itaconic acid, itaconic anhydride, citraconic acid, citraconic anhydride, mesaconic acid, ethylmaleic anhydride, dimethylmaleic anhydride, ethylmaleic acid, dimethylmaleic acid, hexylmaleic acid, and the like, including the corresponding acid halides and lower aliphatic esters.

The molecular weight of the olefin can vary depending upon the intended use of the substituted succinic anhydrides. Typically, the substituted succinic anhydrides can have a hydrocarbyl group of from about 8-500 carbon atoms. However, substituted succinic anhydrides used to make lubricating oil dispersants can typically have a hydrocarbyl group of about 40-500 carbon atoms. With high molecular weight substituted succinic anhydrides, it is more accurate to refer to number average molecular weight (Mn) since the olefins used to make these substituted succinic anhydrides can include a mixture of different molecular weight components resulting from the polymerization of low molecular weight olefin monomers such as ethylene, propylene and isobutylene.

The mole ratio of maleic anhydride to olefin can vary widely. It can vary, for example, from about 5:1 to about 1:5, or for example, from about 1:1 to about 3:1. With olefins such as polyisobutylene having a number average molecular weight of about 500 to about 7000, or as a further example, about 800 to about 3000 or higher and the ethylene-alpha-olefin copolymers, the maleic anhydride can be used in stoichiometric excess, e.g. 1.1 to 3 moles maleic anhydride per mole of olefin. The unreacted maleic anhydride can be vaporized from the resultant reaction mixture.

Polyalkenyl succinic anhydrides can be converted to polyalkyl succinic anhydrides by using conventional reducing conditions such as catalytic hydrogenation. For catalytic hydrogenation, a suitable catalyst is palladium on carbon. Likewise, polyalkenyl succinimides can be converted to polyalkyl succinimides using similar reducing conditions.

The polyalkyl or polyalkenyl substituent on the succinic anhydrides employed herein can be generally derived from polyolefins which are polymers or copolymers of mono-olefins, particularly 1-mono-olefins, such as ethylene, propylene and butylene. The mono-olefin employed can have about 2 to about 24 carbon atoms, or as a further example, about 3 to about 12 carbon atoms. Other suitable mono-olefins include propylene, butylene, particularly isobutylene, 1-octene and 1-decene. Polyolefins prepared from such mono-olefins include polypropylene, polybutene, polyisobutene, and the polyalphaolefins produced from 1-octene and 1-decene.

In some aspects, the ashless dispersant can include one or more alkenyl succinimides of an amine having at least one primary amino group capable of forming an imide group. The alkenyl succinimides can be formed by conventional methods such as by heating an alkenyl succinic anhydride, acid, acid-ester, acid halide, or lower alkyl ester with an amine containing at least one primary amino group. The alkenyl succinic anhydride can be made readily by heating a mixture of polyolefin and maleic anhydride to about 180-220° C. The polyolefin can be a polymer or copolymer of a lower monoolefin such as ethylene, propylene, isobutene and the like, having a number average molecular weight in the range of about 300 to about 3000 as determined by gel permeation chromatography (GPC).

Amines which can be employed in forming the ashless dispersant include any that have at least one primary amino group which can react to form an imide group and at least one additional primary or secondary amino group and/or at least one hydroxyl group. A few representative examples are: N-methyl-propanediamine, N-dodecylpropanediamine, N-aminopropyl-piperazine, ethanolamine, N-ethanol-ethylenediamine, and the like.

Suitable amines can include alkylene polyamines, such as propylene diamine, dipropylene triamine, di-(1,2-butylene) triamine, and tetra-(1,2-propylene)pentamine. A further example includes the ethylene polyamines which can be depicted by the formula $H_2N(CH_2CH_2-NH)_nNH$, wherein n can be an integer from about one to about ten. These include: ethylene diamine, diethylene triamine (DETA), triethylene tetramine (TETA), tetraethylene pentamine (TEPA), pentaethylene hexamine (PEHA), and the like, including mixtures thereof in which case n is the average value of the mixture. Such ethylene polyamines have a primary amine group at each end so they can form mono-alkenylsuccinimides and bis-alkenylsuccinimides. Commercially available ethylene polyamine mixtures can contain minor amounts of branched species and cyclic species such as N-aminoethyl piperazine, N,N'-bis(aminoethyl)piperazine, N,N'-bis(piperazinyl) ethane, and like compounds. The commercial mixtures can have approximate overall compositions falling in the range corresponding to diethylene triamine to tetraethylene pentamine. The molar ratio of polyalkenyl succinic anhydride to polyalkylene polyamines can be from about 1:1 to about 3.0:1.

In some aspects, the dispersant can include the products of the reaction of a polyethylene polyamine, e.g. triethylene tetramine or tetraethylene pentamine, with a hydrocarbon substituted carboxylic acid or anhydride made by reaction of a polyolefin, such as polyisobutene, of suitable molecular weight, with an unsaturated polycarboxylic acid or anhydride, e.g., maleic anhydride, maleic acid, fumaric acid, or the like, including mixtures of two or more such substances.

Polyamines that are also suitable in preparing the dispersants described herein include N-arylphenylenediamines, such as N-phenylphenylenediamines, for example, N-phenyl-1,4-phenylenediamine, N-phenyl-1,3-phenylenediamine, and N-phenyl-1,2-phenylenediamine; aminothiazoles such as aminothiazole, aminobenzothiazole, aminobenzothiadiazole and aminoalkylthiazole; aminocarbazoles; aminoindoles; aminopyrroles; amino-indazolinones; aminomercaptotriazoles; aminoperimidines; aminoalkyl imidazoles, such as 1-(2-aminoethyl)imidazol-e, 1-(3-aminopropyl)imidazole;

and aminoalkyl morpholines, such as 4-(3-aminopropyl)morpholine. These polyamines are described in more detail in U.S. Pat. Nos. 4,863,623 and 5,075,383, the disclosures of which are hereby incorporated by reference herein.

Additional polyamines useful in forming the hydrocarbyl-substituted succinimides include polyamines having at least one primary or secondary amino group and at least one tertiary amino group in the molecule as taught in U.S. Pat. Nos. 5,634,951 and 5,725,612, the disclosures of which are hereby incorporated by reference herein. Non-limiting examples of suitable polyamines include N,N,N'',N''-tetraalkyldialkylenetriamines (two terminal tertiary amino groups and one central secondary amino group), N,N,N',N''-tetraalkyltrialkylenetetramines (one terminal tertiary amino group, two internal tertiary amino groups and one terminal primary amino group), N,N,N',N'',N'''-pentaalkyltrialkylenetetramines (one terminal tertiary amino group, two internal tertiary amino groups and one terminal secondary amino group), tris(dialkylaminoalkyl)aminoalkylmethanes (three terminal tertiary amino groups and one terminal primary amino group), and like compounds, wherein the alkyl groups are the same or different and typically contain no more than about 12 carbon atoms each, and which can contain from about 1 to about 4 carbon atoms each. As a further example, these alkyl groups can be methyl and/or ethyl groups. Polyamine reactants of this type can include dimethylaminopropylamine (DMAPA) and N-methyl piperazine.

Hydroxyamines suitable for herein include compounds, oligomers or polymers containing at least one primary or secondary amine capable of reacting with the hydrocarbyl-substituted succinic acid or anhydride. Examples of hydroxyamines suitable for use herein include aminoethylethanolamine (AEEA), aminopropyldiethanolamine (APDEA), ethanolamine, diethanolamine (DEA), partially propoxylated hexamethylene diamine (for example HMDA-2PO or HMDA-3PO), 3-amino-1,2-propanediol, tris(hydroxymethyl)aminomethane, and 2-amino-1,3-propanediol.

The mole ratio of amine to hydrocarbyl-substituted succinic acid or anhydride can range from about 1:1 to about 3.0:1. Another example of a mole ratio of amine to hydrocarbyl-substituted succinic acid or anhydride may range from about 1.5:1 to about 2.0:1.

The foregoing dispersant can also be a post-treated dispersant made, for example, by treating the dispersant with maleic anhydride and boric acid as described, for example, in U.S. Pat. No. 5,789,353, or by treating the dispersant with nonylphenol, formaldehyde and glycolic acid as described, for example, in U.S. Pat. No. 5,137,980, the disclosures of which are hereby incorporated by reference in their entirety.

The Mannich base dispersants can be a reaction product of an alkyl phenol, typically having a long chain alkyl substitutent on the ring, with one or more aliphatic aldehydes containing from about 1 to about 7 carbon atoms (for example, formaldehyde and derivatives thereof) and polyamines (especially polyalkylene polyamines). For example, a Mannich base ashless dispersants can be formed by condensing about one molar proportion of long chain hydrocarbon-substituted phenol with from about 1 to about 2.5 moles of formaldehyde and from about 0.5 to about 2 moles of polyalkylene polyamine.

Hydrocarbon sources for preparation of the Mannich polyamine dispersants can be those derived from substantially saturated petroleum fractions and olefin polymers, such as polymers of mono-olefins having from 2 to about 6 carbon atoms. The hydrocarbon source generally contains, for example, at least about 40 carbon atoms, and as a further example, at least about 50 carbon atoms to provide substantial oil solubility to the dispersant. The olefin polymers having a GPC number average molecular weight range from about 600 to 5,000 can be suitable. However, polymers of higher molecular weight can also be used. Suitable hydrocarbon sources can be isobutylene polymers and polymers made from a mixture of isobutene and a raffinate stream.

Suitable Mannich base dispersants can be Mannich base ashless dispersants formed by condensing about one molar proportion of long chain hydrocarbon-substituted phenol with from about 1 to about 2.5 moles of formaldehyde and from about 0.5 to about 2 moles of polyalkylene polyamine.

Polymeric polyamine dispersants suitable as the ashless dispersants are polymers containing basic amine groups and oil solubilizing groups (for example, pendant alkyl groups having at least about 8 carbon atoms). Such materials are illustrated by interpolymers formed from various monomers such as decyl methacrylate, vinyl decyl ether or relatively high molecular weight olefins, with aminoalkyl acrylates and aminoalkyl acrylamides. Examples of polymeric polyamine dispersants are set forth in U.S. Pat. Nos. 3,329,658; 3,449,250; 3,493,520; 3,519,565; 3,666,730; 3,687,849; and 3,702,300. Polymeric polyamines can include hydrocarbyl polyamines wherein the hydrocarbyl group is composed of the polymerization product of isobutene and a raffinate I stream as described above. PIB-amine and PIB-polyamines may also be used.

Methods for the production of ashless dispersants as described above are known to those skilled in the art and are reported in the patent literature. For example, the synthesis of various ashless dispersants of the foregoing types is described in such patents as U.S. Pat. Nos. 2,459,112; 2,962,442, 2,984,550; 3,036,003; 3,163,603; 3,166,516; 3,172,892; 3,184,474; 3,202,678; 3,215,707; 3,216,936; 3,219,666; 3,236,770; 3,254,025; 3,271,310; 3,272,746; 3,275,554; 3,281,357; 3,306,908; 3,311,558; 3,316,177; 3,331,776; 3,340,281; 3,341,542; 3,346,493; 3,351,552; 3,355,270; 3,368,972; 3,381,022; 3,399,141; 3,413,347; 3,415,750; 3,433,744; 3,438,757; 3,442,808; 3,444,170; 3,448,047; 3,448,048; 3,448,049; 3,451,933; 3,454,497; 3,454,555; 3,454,607; 3,459,661; 3,461,172; 3,467,668; 3,493,520; 3,501,405; 3,522,179; 3,539,633; 3,541,012; 3,542,680; 3,543,678; 3,558,743; 3,565,804; 3,567,637; 3,574,101; 3,576,743; 3,586,629; 3,591,598; 3,600,372; 3,630,904; 3,632,510; 3,632,511; 3,634,515; 3,649,229; 3,697,428; 3,697,574; 3,703,536; 3,704,308; 3,725,277; 3,725,441; 3,725,480; 3,726,882; 3,736,357; 3,751,365; 3,756,953; 3,793,202; 3,798,165; 3,798,247; 3,803,039; 3,804,763; 3,836,471; 3,862,981; 3,872,019; 3,904,595; 3,936,480; 3,948,800; 3,950,341; 3,957,746; 3,957,854; 3,957,855; 3,980,569; 3,985,802; 3,991,098; 4,006,089; 4,011,380; 4,025,451; 4,058,468; 4,071,548; 4,083,699; 4,090,854; 4,173,540; 4,234,435; 4,354,950; 4,485,023; 5,137,980, and Re 26,433, herein incorporated by reference.

An example of a suitable ashless dispersant is a borated dispersant. Borated dispersants can be formed by boronating ("borating") an ashless dispersant having basic nitrogen and/or at least one hydroxyl group in the molecule, such as a succinimide dispersant, succinamide dispersant, succinic ester dispersant, succinic ester-amide dispersant, Mannich base dispersant, or hydrocarbyl amine or polyamine dispersant. Methods that can be used for borating the various types of ashless dispersants described above are described in U.S. Pat. Nos. 3,087,936; 3,254,025; 3,281,428; 3,282,955; 2,284,409; 2,284,410; 3,338,832; 3,344,069; 3,533,945; 3,658,836; 3,703,536; 3,718,663; 4,455,243; and 4,652,387, the disclosures of which are hereby incorporated by reference in their entirety.

The borated dispersant can include a high molecular weight dispersant treated with boron such that the borated dispersant includes up to about 2 wt % of boron, for example from about 0.8 wt % or less of boron, as a further example from about 0.1 to about 0.7 wt % of boron, as an even further example, from about 0.25 to about 0.7 wt % of boron, and as a further example from about 0.35 to about 0.7 wt % of boron. The dispersant can be dissolved in oil of suitable viscosity for ease of handling. It should be understood that the weight percentages given here are for neat dispersant, without any diluent oil added.

A dispersant can be further reacted with an organic acid, an anhydride, and/or an aldehyde/phenol mixture. Such a process can enhance compatibility with elastomer seals, for example. The borated dispersant can further include a mixture of borated dispersants. As a further example, the borated dispersant can include a nitrogen-containing dispersant and/or may be free of phosphorus.

A dispersant can be present in the lubricating composition in an amount of about 0.1 wt % to about 10 wt %, for example from about 1 wt % to about 7 wt %, and as a further example from about 2 wt % to about 5 wt % of the lubricating composition.

In an aspect, the dispersant for use in the disclosed lubricant composition can be an ethylene-propylene dispersant. In particular, the dispersant can be an ethylene-propylene copolymer grafted with maleic anhydride and reacted with n-phenyl phenylene diamine.

Low molecular weight ethylene-alpha-olefin succinic anhydride dispersants, as described in U.S. Pat. Nos. 5,075,383 and 6,117,825, the disclosures of which are hereby incorporated by reference, are also suitable for use herein. Also suitable in the present disclosure are ethylene alpha-olefin polymers as described in U.S. Pat. Nos. 5,266,223; 5,350,532; and 5,435,926, the disclosures of which are hereby incorporated by reference. Ethylene-propylene diene polymers, such as those described in U.S. Pat. Nos. 4,952,637, 5,356,999, 5,374,364, and 5,424,366, the disclosures of which are hereby incorporated by reference, are also suitable.

A cross-linked low molecular weight ethylene-propylene succinic anhydride dispersant is also suitable for use in the present invention. These cross-linked dispersants are similar to the low molecular weight ethylene alpha-olefin succinic anhydride dispersants discussed above, but additionally contain a multifunctional polyamine to achieve advantageous cross linking, as described in U.S. Pat. No. 6,107,258, the disclosure of which is hereby incorporated by reference.

Suitable dispersants will be derived from ethylene-alpha-olefin polymers having a molecular weight of ranging from about 300 to about 25,000, for example from about 1000 to about 15,000; more as a further example from about 5,000 to about 15,000.

In an additional aspect, the dispersant can be a highly grafted, amine derivatized functionalized ethylene-propylene copolymer as described fully in U.S. Pat. Nos. 5,139,688 and 6,107,257, the disclosures of which are hereby incorporated by reference.

In an aspect, the dispersant can be a functionalized olefin copolymer. The polymer or copolymer substrate can be prepared from ethylene and propylene or it can be prepared from ethylene and at least one higher olefin within the range of $C_3$ to $C_{23}$ alpha-olefins.

Non-limiting examples of polymers for use herein include copolymers of ethylene and at least one $C_3$ to $C_{23}$ alpha-olefins. In an aspect, copolymers of ethylene and propylene can be used. Other alpha-olefins suitable in place of propylene to form the copolymer or to be used in combination with ethylene and propylene to form a terpolymer include 1-butene, 2-butene, isobutene, 1-pentene, 1-hexene, 1-octene and styrene; α,ω-diolefins such as 1,5-hexadiene, 1,6-heptadiene, 1,7-octadiene; branched chain alpha-olefins such as 4-methylbutene—1,5-methylpentene-1, and 6-methylheptene-1; and mixtures thereof.

More complex polymer substrates, often designated as interpolymers, can be prepared using a third component. The third component generally used to prepare an interpolymer substrate can be a polyene monomer selected from non-conjugated dienes and trienes. The non-conjugated diene component can be one having from 5 to 14 carbon atoms in the chain. For example, the diene monomer can be characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-methylene-2-norborene, 1,5-heptadiene, and 1,6-octadiene. A mixture of more than one diene can be used in the preparation of the interpolymer. In an embodiment, a non-conjugated diene for preparing a terpolymer or interpolymer substrate can be 1,4-hexadiene.

The triene component can have at least two non-conjugated double bonds, and up to about 30 carbon atoms in the chain. Typical trienes useful in preparing the interpolymer of the invention can be 1-isopropylidene-3α,4,7,7α.-tetrahydroindene, 1-isopropylidenedicyclopentadiene, dihydro-isodicyclopentadiene, and 2-(2-methylene-4-methyl-3-pentenyl) (2.2.1) bicyclo-5-heptene.

Ethylene-propylene or higher alpha-olefin copolymers can comprise from about 15 to 80 mole percent ethylene and from about 85 to 20 mole percent $C_3$ to $C_{23}$ alpha-olefin with, for example, mole ratios from about 35 to 75 mole percent ethylene and from about 65 to 25 mole percent of a $C_3$ to $C_{23}$ alpha-olefin, with for example proportions being from 50 to 70 mole percent ethylene and 50 to 30 mole percent $C_3$ to $C_{23}$ alpha-olefin, and as a further example proportions being from 55 to 65 mole percent ethylene and 45 to 35 mole percent $C_3$ to $C_{23}$ alpha-olefin.

Terpolymer variations of the foregoing polymers can comprise from about 0.1 to 10 mole percent of a non-conjugated diene or triene.

The terms polymer and copolymer can be used generically to encompass ethylene copolymers, terpolymers or interpolymers. These materials can comprise minor amounts of other olefinic monomers so long as the basic characteristics of the ethylene copolymers are not materially changed. One of ordinary skill in the art would understand how to make these functionalized olefin copolymers. For example, U.S. Pat. No. 6,107,257, the disclosure of which is hereby incorporated by reference, discloses methods for making functionalized olefin copolymers.

The dispersant can also be a polyalkyl(meth)acrylate copolymer comprising units derived from: (A) about 12 to about 18 weight percent methyl methacrylate; (B) about 75 to about 85 weight percent of $C_{10}$-$C_{15}$ alkyl (meth)acrylate(s); and (C) about 2 to about 5 weight percent of a nitrogen-containing dispersant monomer. The polyalkyl(meth)acrylate copolymers can comprise the reaction products of: (A) from about 12 to about 18, weight percent methyl methacrylate; (B) from about 75 to about 85, weight percent of $C_{10}$-$C_{15}$ alkyl(meth)acrylate(s); and (c) from about 2 to about 5, weight percent of a nitrogen-containing dispersant monomer.

As used herein, $C_{10}$-$C_{15}$ alkyl(meth)acrylate means an alkyl ester of acrylic or methacrylic acid having a straight or branched alkyl group of 10 to 15 carbon atoms per group including, but not limited to, decyl(meth)acrylate, isodecyl (meth)acrylate, undecyl(meth)acrylate, lauryl(meth)acrylate, myristyl(meth)acrylate, dodecyl pentadecyl methacrylate, and mixtures thereof;

The alkyl(meth)acrylate comonomers containing 10 or more carbon atoms in the alkyl group can generally be prepared by standard esterification procedures using technical grades of long chain aliphatic alcohols, and these commercially available alcohols are mixtures of alcohols of varying chain lengths in the alkyl groups. Consequently, for the purposes of this disclosure, alkyl(meth)acrylate is intended to include not only the individual alkyl(meth)acrylate product named, but also to include mixtures of the alkyl(meth)acrylates with a predominant amount of the particular alkyl(meth)acrylate named.

The nitrogen-containing dispersant monomers suitable for use herein include dialkylamino alkyl(meth)acrylamides such as, N,N-dimethylaminopropyl methacrylamide; N,N-diethylaminopropyl methacrylamide; N,N-dimethylaminoethyl acrylamide and N,N-diethylaminoethyl acrylamide; and dialkylaminoalkyl (meth)acrylates such as N,N-dimethylaminoethyl methacrylate; N,N-diethylaminoethyl acrylate and N,N-dimethylaminoethyl thiomethacrylate.

In an aspect, the polyalkyl(meth)acrylate copolymers consist essentially of the reaction products of (A), (B) and (C). However, those skilled in the art will appreciate that minor levels of other monomers, polymerizable with monomers (A), (B) and/or (C) disclosed herein, can be present as long as they do not adversely affect the low temperature properties of the fully formulated fluids. Typically additional monomers are present in an amount of less than about 5 weight percent, for example in an amount of less than 3 weight percent, and as a further example in an amount of less than 1 weight percent. For example, the addition of minor levels of monomers such as $C_2$-$C_9$ alkyl(meth)acrylates, hydroxy- or alkoxy-containing alkyl(meth)acrylates, ethylene, propylene, styrene, vinyl acetate and the like are contemplated within the scope of this disclosure. In an aspect, the sum of the weight percent of (A), (B) and (C) equals 100%.

The copolymers can be prepared by various polymerization techniques including free-radical and anionic polymerization.

Conventional methods of free-radical polymerization can be used to prepare the copolymers. Polymerization of the acrylic and/or methacrylic monomers can take place under a variety of conditions, including bulk polymerization, solution polymerization, usually in an organic solvent, preferably mineral oil, emulsion polymerization, suspension polymerization and non-aqueous dispersion techniques.

Optionally, other components can be present in the lubricant composition. Non-limiting examples of other components include antiwear agents, detergent, diluents, defoamers, demulsifiers, anti-foam agents, corrosion inhibitors, extreme pressure agents, seal well agents, antioxidants, pour point depressants, rust inhibitors and friction modifiers.

The lubricating compositions disclosed herein can be used to lubricate anything. In an aspect, the lubricating composition can be an engine composition that is used to lubricate an engine. However, one of ordinary skill in the art would understand that the disclosed lubricating compositions can be used to lubricate anything, e.g., any surface, such as those where thin-film friction can be present. Moreover, there is disclosed a method of reducing thin-film friction of a fluid between surfaces comprising providing to the fluid the disclosed composition.

It is further envisioned that the lubricating compositions can be provided to any machinery wherein fuel economy is an issue. In particular, there is disclosed a method of increasing fuel efficiency in a vehicle comprising providing to a vehicle the disclosed composition Also disclosed herein is a method of lubricating a machine, such as an engine, transmission, automotive gear, a gear set, and/or an axle with the disclosed lubricating composition. In a further aspect, there is disclosed a method of improving fuel efficiency in a machine, such as an engine, transmission automotive gear, a gear set, and/or an axle comprising placing the disclosed lubricating composition in the machine, such as an engine, transmission, automotive gear, a gear set, and/or an axle.

EXAMPLES

Example 1

Base Oils

It is known in the industry that Group II base oils comprise more than 90% saturates, less than 0.03% sulfur, and have a viscosity index from about 80 to about 120. However, not all Group II base oils have the same thin-film frictional properties. The base oils in Table 1 were analyzed according to the procedure in Analytical Chemistry, 64:2227 (1992), the disclosure of which is hereby incorporated by reference, in order to determine the type of paraffins, cycloparaffins, and aromatics in the oil.

The thin-film friction coefficient of various known base oils (three Group 11 base oils and a PAO) was measured at 100° C./20N load with a 20% slide to roll ratio at 1.5 m/s.

TABLE 1

| Base Oils | Thin-Film Friction Coefficient | Kinematic Viscosity at 100° C. | % Tetracycloparaffins in Base Oil |
|---|---|---|---|
| A | 0.066 | 4.05 cSt | 3.33 |
| B | 0.044 | 4.60 cSt | 1.48 |
| C | 0.030 | 4.09 cSt | 1.57 |
| PAO | 0.027 | 4.00 cSt | 0.00 |

As shown in Table 1, a base oil A and a base oil C have similar kinematic viscosities, but base oil A has a higher thin-film friction coefficient. Moreover, base oil B has a higher kinematic viscosity as compared to base oil A, but has a lower thin-film friction coefficient. The results for PAO show that in an oil with no tetracycloparaffins thin-film friction is low.

Moreover, as shown in Table 1, those base oils having less than about 3% tetracycloparaffins exhibited a lower thin-film friction. One of ordinary skill in the art would understand that the lower the thin-film friction the better the fuel economy.

Example 2

Base Oils and Phosphorus-Containing Compounds

SAE 2000-01-2030 shows that phosphorus-containing compounds form films on surfaces that result in an increase in thin-film friction. For example, zinc dialkyl dithiophosphate (ZDDP) can cause thin-film friction to increase. ZDDP is the most common phosphorus-containing compound found in engine oils.

Various phosphorus-containing compounds were combined/mixed/blended with each of base oil A (a base oil having 3.33% tetracycloparaffins) and base oil C (a base oil having less than about 3% tetracycloparaffins) and their thin-film friction coefficient was measured as described in Example 1.

TABLE 2

|  | BASE OIL A | BASE OIL C |
| --- | --- | --- |
| +1% ZDDP | 0.097 | 0.074 |
| +0.4% AAP | 0.040 | 0.034 |
| +1% S-NPGP | 0.069 | 0.066 |
| +0.4% phosphonate | 0.055 | 0.035 |

The results show that compositions comprising a phosphorus-containing compound and a base oil comprising less than about 4% by weight of tetracycloparaffins exhibited a lower thin-film friction coefficient. One of ordinary skill in the art would understand that the lower the thin-film friction the better the fuel economy.

Example 3

Combinations of Additives in a Base Oil

It has been reported that when a full complement of additives, such as dispersants, detergents, anti-wear agents, and/or antioxidants is added to an oil the thin-film friction increases. See M. T. Devlin, T. Hammock, and T-C. Jao, "Effect of Mechanical Shear on the Thin Film Properties of Base Oil/Polymer Mixtures", Lubrication Science Vol. 14 (2), 2002, the disclosure of which is hereby incorporated by reference. Various combinations of additives were combined/mixed/blended with each of base oil A and base oil C to determine their thin-film friction coefficient. In the compositions, the AAP was added at 0.6% by weight, and the molybdenum-containing friction modifier compound contained about 480 ppm of molybdenum. Moreover, when the glycerol monooleate was present in the additive package, it was added at 0.60% weight. Similarly, when the dispersant was present in the additive package, it was added at 3.0% weight. The thin-film friction coefficient was measured as described in Example 1.

TABLE 3

|  | BASE OIL A | BASE OIL C |
| --- | --- | --- |
| +1% ZDDP | 0.097 | 0.074 |
| AAP/succinimide/glycerol monooleate | 0.050 | 0.041 |
| AAP/succinimide/molybdenum-containing friction modifier compound | 0.039 | 0.036 |
| AAP/succinimide/glycerol monooleate and molybdenum-containing friction modifier compound | 0.061 | 0.046 |
| AAP/functionalized olefin copolymer/glycerol monooleate | 0.010 | 0.012 |
| AAP/functionalized olefin copolymer/molybdenum-containing friction modifier compound | 0.041 | 0.047 |
| AAP/functionalized olefin copolymer/glycerol monooleate and molybdenum-containing friction modifier compound | 0.050 | 0.051 |

The results show that the additive compositions with the succinimide dispersant all exhibited low thin-film friction coefficients as compared to the compositions with the functionalized olefin copolymer dispersant. The results show that the compositions with AAP and various dispersants and friction modifiers all exhibited low thin-film friction as compared to the composition of ZDDP in base oil At numerous places throughout this specification, reference has been made to a number of U.S. patents, published foreign patent applications and published technical papers. All such cited documents are expressly incorporated in full into this disclosure as if fully set forth herein.

For the purposes of this specification and appended claims unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A lubricant composition comprising a phosphorus-containing compound and a mineral base oil comprising less than about 3%, and not 0%, by weight of tetracycloparaffins.

2. The composition of claim 1, wherein the phosphorus-containing compound is a metal-free, phosphorus-containing compound.

3. The composition of claim 2, wherein the metal-free, phosphorus-containing compound is chosen from amyl acid phosphate, neopentyl glycol phosphite, a salt of a neopentyl glycol phosphite, and a phosphonate.

4. The composition of claim 1, wherein the phosphorus-containing compound is a sulfur-containing, phosphorus-containing compound.

5. The composition of claim 4, wherein the sulfur-containing, phosphorus-containing compound is chosen from thiophosphates, dithiophosphates, sulfur-containing neopentyl glycol phosphite, and a salt of a sulfur-containing neopentyl glycol phosphite.

6. The composition of claim 1, further comprising a dispersant.

7. The composition of claim 6, wherein the dispersant is at least one of succinimide, borated succinimide, Mannich dispersant, functionalized olefin copolymer, and poly(meth) acrylate copolymers.

8. The composition of claim 7, wherein the dispersant is a succinimide.

9. The composition of claim 6, wherein the dispersant is a highly grafted, amine derivatized functionalized ethylene-propylene copolymer.

10. The composition of claim 1, further comprising a friction modifier.

11. The composition of claim 10, wherein the friction modifier is at least one of a non-nitrogen-containing compound, a nitrogen-containing compound, and an ash-containing compound.

12. The composition of claim 11, wherein the nitrogen-containing compound is a long chain alkylene amine.

13. The composition of claim 12, wherein the long chain alkylene amine is chosen from N-oleyl-trimethylene diamine, N-tallow-trimethylene diamine, coco-trimethylene diamine, and mixtures thereof.

14. The composition of claim 11, wherein the nitrogen-containing compound is diethanolamine.

15. The composition of claim 11, wherein the ash-containing compound is chosen from molybdenum-containing compounds, titanium-containing compounds, and tungsten-containing compounds.

16. The composition of claim 15, wherein the molybdenum-containing compound comprises sulfur.

17. The composition of claim 15, wherein the molybdenum-containing compound is chosen from molybdenum carboxylates, molybdenum amides, molybdenum thiophosphates, molybdenum thiocarbamates, and mixtures thereof.

18. The composition of claim 11, wherein the non-nitrogen-containing compound is a polyolester.

19. The composition of claim 18, wherein the polyolester is chosen from glycerol monooleate and glycerol monolaurate.

20. A lubricant composition comprising a mineral base oil comprising less than about 3% by weight of tetracycloparaffins; a metal-free-containing, phosphorus-containing compound; a dispersant; and a friction modifier.

21. The composition of claim 20, wherein the dispersant is a succinimide.

22. The composition of claim 20, wherein the friction modifier is at least one of a non-nitrogen-containing compound and a molybdenum-containing compound.

23. A lubricant composition comprising a mineral base oil comprising less than about 3%, and not 0%, by weight of tetracycloparaffins; a metal-free containing, phosphorus-containing compound; an ethylene-propylene copolymer; and a friction modifier.

24. A method of reducing thin-film friction of a fluid between surfaces comprising providing to the fluid a composition comprising a phosphorus-containing compound and a mineral base oil comprising less than about 3%, and not 0%, by weight of tetracycloparaffins.

25. A method of increasing fuel efficiency in a vehicle comprising providing to a vehicle a composition comprising a phosphorus-containing compound and a mineral base oil comprising less than about 3%, and not 0%, by weight of tetracycloparaffins.

26. An engine, transmission or gear set lubricated with a lubricant composition according to claim 1.

27. A method of making a lubricant composition comprising combining a phosphorus-containing compound and a mineral base oil comprising less than about 3%, and not 0%, by weight of tetracycloparaffins.

28. A method for lubricating a machine comprising providing to the machine the lubricant composition of claim 1.

29. The method of claim 28, wherein the machine is a gear.

30. The method of claim 28, wherein the machine is an engine.

* * * * *